United States Patent
Ohta et al.

(10) Patent No.: US 12,479,007 B2
(45) Date of Patent: Nov. 25, 2025

(54) ULTRASONIC TRANSDUCER

(71) Applicant: TDK CORPORATION, Tokyo (JP)

(72) Inventors: Yoshiki Ohta, Tokyo (JP); Mikio Sumiyoshi, Tokyo (JP); Nana Sato, Tokyo (JP); Mitsunao Homma, Tokyo (JP); Hiroyuki Ijiri, Tokyo (JP)

(73) Assignee: TDK CORPORATION, Tokyo (JP)

( * ) Notice: Subject to any disclaimer, the term of this patent is extended or adjusted under 35 U.S.C. 154(b) by 954 days.

(21) Appl. No.: 17/674,102

(22) Filed: Feb. 17, 2022

(65) Prior Publication Data

US 2022/0288637 A1    Sep. 15, 2022

(30) Foreign Application Priority Data

Mar. 9, 2021    (JP) .................................. 2021-037274

(51) Int. Cl.
    *B06B 1/06*     (2006.01)
    *G01S 7/521*     (2006.01)
    *G10K 11/00*     (2006.01)
    *G10K 9/122*     (2006.01)

(52) U.S. Cl.
    CPC ............ *B06B 1/0685* (2013.01); *G01S 7/521* (2013.01); *G10K 11/002* (2013.01); *G10K 11/004* (2013.01); *G10K 9/122* (2013.01)

(58) Field of Classification Search
    CPC ................................ B06B 1/06; B06B 1/0685
    USPC .................................................. 310/322, 334
    See application file for complete search history.

(56) References Cited

U.S. PATENT DOCUMENTS

| | | | |
|---|---|---|---|
| 5,318,035 A | 6/1994 | Konno et al. | |
| 6,396,199 B1* | 5/2002 | Douglas | G10K 11/30 |
| | | | 310/334 |
| 2003/0231549 A1 | 12/2003 | Shiraishi et al. | |
| 2008/0168841 A1* | 7/2008 | Matsuo | G10K 9/22 |
| | | | 73/649 |
| 2008/0290758 A1* | 11/2008 | Hayashi | G10K 9/122 |
| | | | 29/25.35 |
| 2008/0309199 A1* | 12/2008 | Furukawa | G10K 9/18 |
| | | | 310/334 |

FOREIGN PATENT DOCUMENTS

| | | |
|---|---|---|
| CN | 101258772 A | 9/2008 |
| JP | H06-122169 A | 5/1994 |
| JP | 2004-045389 A | 2/2004 |
| JP | 2004-260239 A | 9/2004 |
| JP | 2009-058298 A | 3/2009 |

* cited by examiner

*Primary Examiner* — Derek J Rosenau
(74) *Attorney, Agent, or Firm* — Oliff PLC

(57) ABSTRACT

An ultrasonic transducer includes a case, a piezoelectric element, a wiring member, a foaming member, and a vibration damping material. The case includes a bottom wall. The piezoelectric element is disposed on the bottom wall inside the case. The wiring member is electrically connected to the piezoelectric element. The foaming member is disposed on the piezoelectric element. The vibration damping material is disposed between the piezoelectric element and the foaming member. The foaming member has a bottom surface opposing the piezoelectric element in a thickness direction of the piezoelectric element. A plurality of depressions is formed on the bottom surface. The vibration damping material bonds the piezoelectric element and the bottom surface.

19 Claims, 10 Drawing Sheets

ULTRASONIC TRANSDUCER

TECHNICAL FIELD

The present disclosure relates to an ultrasonic transducer.

BACKGROUND

An ultrasonic transmitter and receiver including a storage case, a piezoelectric vibration element disposed in the storage case, a soundproof filler such as a felt placed on the piezoelectric vibration element, and an insulating resin for sealing such as silicone resin that seals the storage case is disclosed in Japanese Unexamined Patent Publication No. 2004-260239.

SUMMARY

An ultrasonic transducer is required to further reduce reverberation of an ultrasonic component. However, in the above-described ultrasonic device, a sufficient reduction in the reverberation of the ultrasonic component is difficult.

One aspect of the present disclosure provides an ultrasonic transducer that further reduces the reverberation of the ultrasonic component.

An ultrasonic transducer according to an aspect of the present disclosure includes a case, a piezoelectric element, a wiring member, a foaming member, and a vibration damping material. The case includes a bottom wall. The piezoelectric element is disposed on the bottom wall inside the case. The wiring member is electrically connected to the piezoelectric element. The foaming member is disposed on the piezoelectric element. The vibration damping material is disposed between the piezoelectric element and the foaming member. The foaming member has a bottom surface opposing the piezoelectric element in a thickness direction of the piezoelectric element. A plurality of depressions is formed on the bottom surface. The vibration damping material bonds the piezoelectric element and the bottom surface.

In the aspect, since the vibration damping material bonds the bottom surface of the foaming member and the piezoelectric element, vibration of the piezoelectric element can be suppressed by the vibration damping material. Since the plurality of depressions is formed on the bottom surface of the foaming member, the vibration damping material can be inserted into the plurality of depressions. In this way, the vibration damping material can be allowed to follow the shape of the bottom surface, and the foaming member and the piezoelectric element can be strongly bonded. As a result, the reverberation of the ultrasonic component can be further reduced.

In the aspect, a thickness of the vibration damping material may be 0.5 times or more and 1.5 times or less a thickness of the piezoelectric element. In this case, the reverberation of the ultrasonic component is further reduced.

In the aspect, the vibration damping material may seep into the foaming member from the bottom surface. In this case, the reverberation of the ultrasonic component is further reduced.

In the aspect, the bottom wall may include an arrangement region in which the piezoelectric element is disposed and a peripheral region surrounding the arrangement region. A cavity may be formed between the peripheral region and the bottom surface. In this case, the vibration of the piezoelectric element is not easily restrained. Therefore, transmission and reception sensitivity increases.

In the aspect, the bottom wall may include an arrangement region in which the piezoelectric element is disposed and a peripheral region surrounding the arrangement region. The vibration damping material may include a first portion filling a space between the peripheral region and the bottom surface. In this case, the reverberation of the ultrasonic component is further reduced by the first portion.

In the aspect, the case may include a side wall. The foaming member may have a side surface opposing the side wall. The vibration damping material may include a second portion connected to the first portion and disposed between the side wall and the side surface. In this case, since the vibration transmitted through the side wall is suppressed by the second portion, the reverberation of the ultrasonic component is further reduced.

In the aspect, the wiring member may be a flexible substrate. In this case, since the wiring member is thin, it is easy to set the thickness of the vibration damping material in an appropriate range.

In the aspect, the vibration damping material may be made of resin. In this case, the reverberation of the ultrasonic component is reliably reduced.

In the aspect, the foaming member may contain an open cell. In this case, the vibration damping material easily seeps into the foaming member.

In the aspect, the wiring member may be covered with the vibration damping material on both sides in a thickness direction of the piezoelectric element. In this case, the reverberation of the ultrasonic component is further reduced.

According to one aspect of the present disclosure, there is provided an ultrasonic transducer that further reduces the reverberation of the ultrasonic component.

DETAILED DESCRIPTION

Hereinafter, an embodiment of the invention will be described in detail with reference to the accompanying drawings. In the description, the same reference symbols are used for the same elements or elements having the same function, and duplicate explanations will be omitted.

A configuration of an ultrasonic transducer 1 according to an embodiment will be described with reference to FIGS. 1 to 8.

The ultrasonic transducer 1 can oscillate in response to an electric signal input from the outside and output an ultrasonic signal. Further, when the ultrasonic transducer 1 receives an ultrasonic signal from the outside, the ultrasonic transducer 1 can transmit the signal as an electric signal to the outside.

Figure 2:
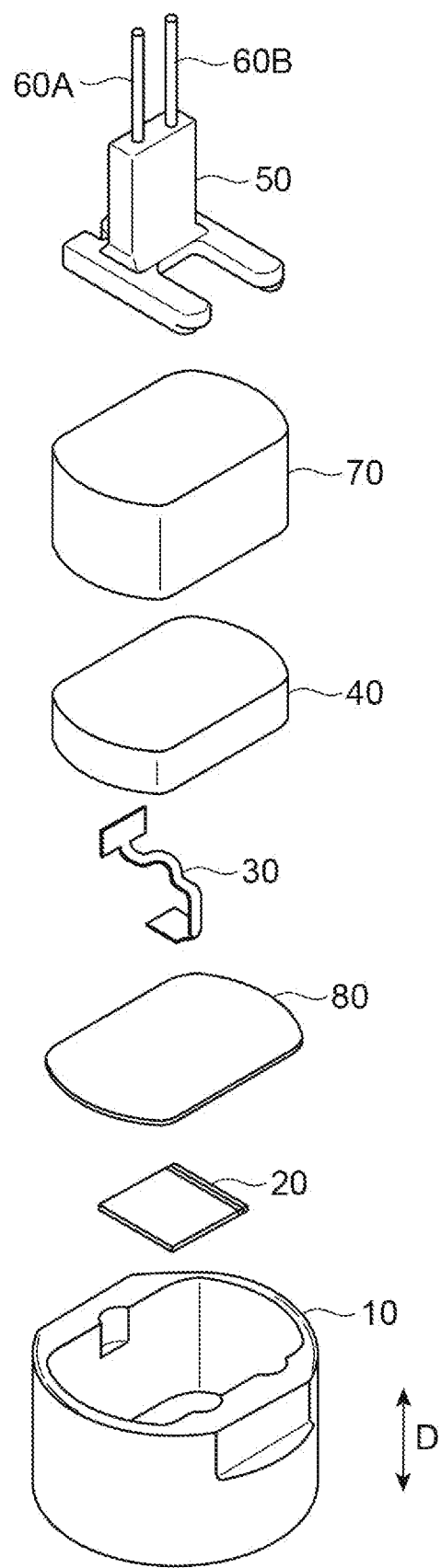
FIG. 2 is an exploded perspective view of the ultrasonic transducer illustrated in FIG. 1.

As illustrated in FIG. 2, the ultrasonic transducer 1 has a configuration capable of transmitting and receiving ultrasonic waves, and specifically includes a case 10, a piezoelectric element 20, a wiring member 30, a foaming member 40, a holding member 50, a pair of pin terminals 60A and 60B, a filler 70, and a vibration damping material 80.

The case 10 is a cup-shaped member including a substantially cylindrical tubular portion 14 (side wall) and a bottom wall portion 12 (bottom wall) that closes a lower end opening of the tubular portion 14. The case 10 is made of, for example, a metal (an aluminum alloy as an example).

Figure 3:
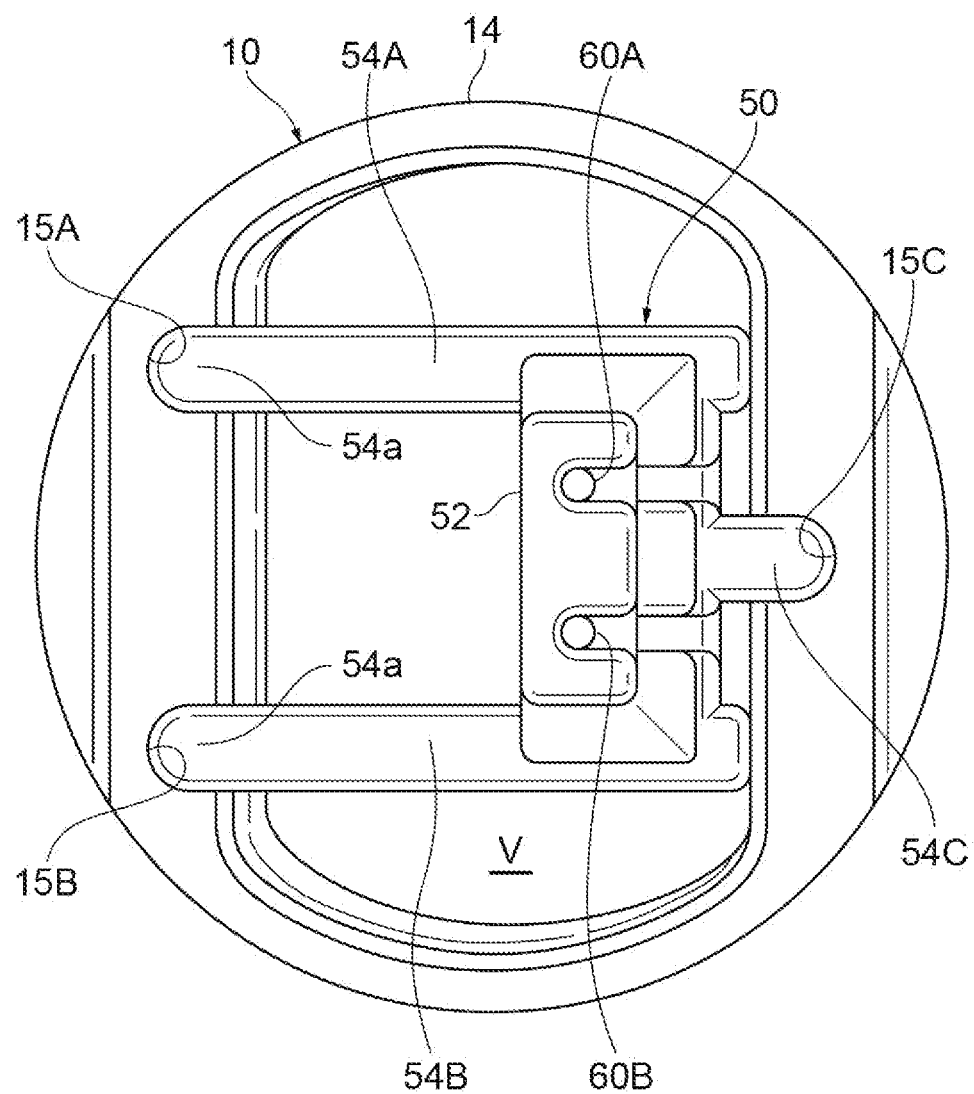
FIG. 3 is a schematic plan view illustrating a case, a holding member, and a pair of pin terminals.
Figure 4:
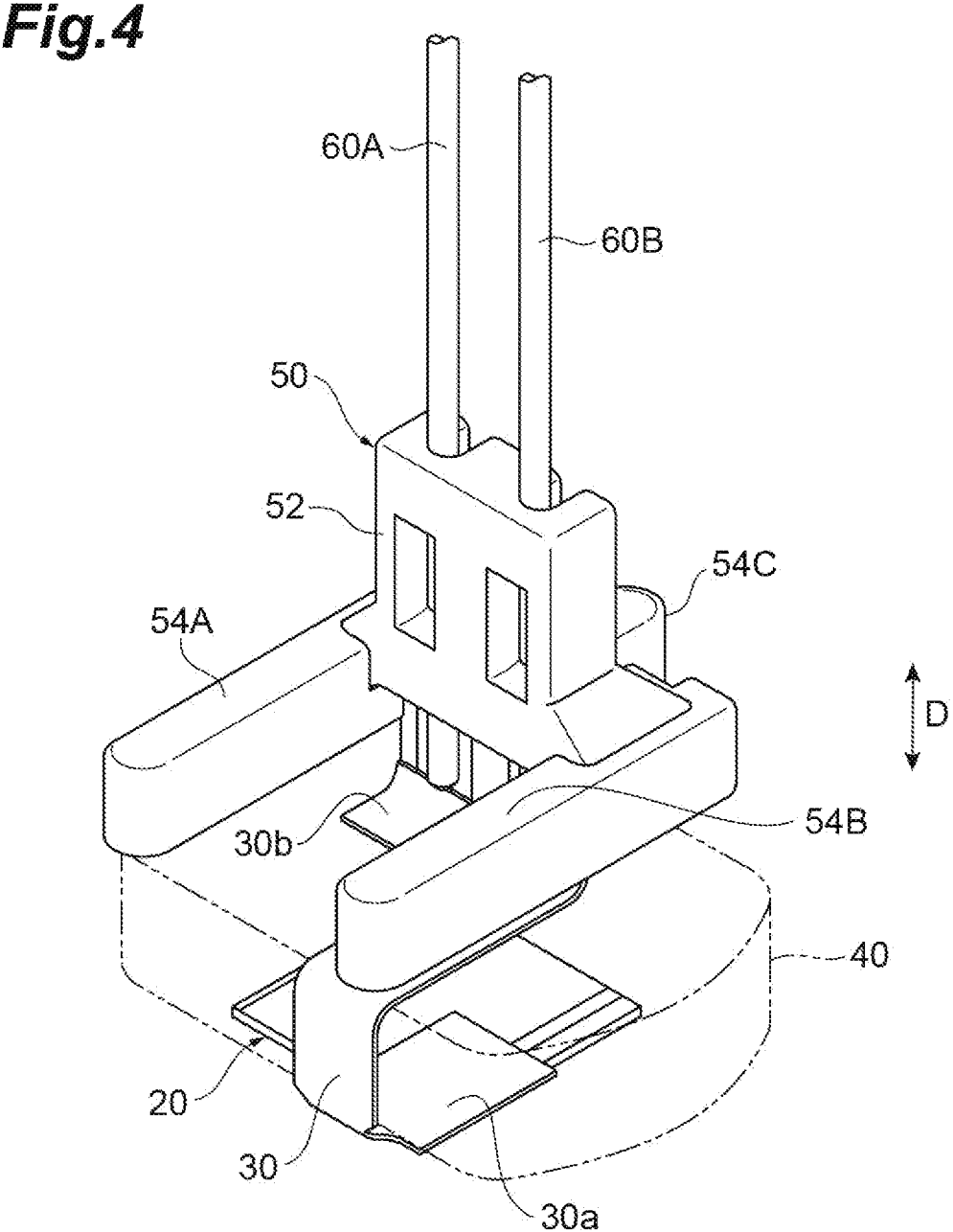
FIG. 4 is a schematic perspective view illustrating a piezoelectric element, a wiring member, a foaming member, a holding member, and a pair of pin terminals.

An accommodation space is defined inside the tubular portion 14, and a shape of the accommodation space in a cross section orthogonal to an extending direction of the tubular portion 14 is substantially an ellipse (or rounded rectangle). That is, the accommodation space has a cross-sectional shape extending in one direction (vertical direction in FIG. 3). As illustrated in FIG. 3, the tubular portion 14 is provided with three recessed portions 15A to 15C on an edge of an upper side opening. Three recessed portions 15A to 15C are configured as two recessed portions 15A and 15B and one recessed portion 15C disposed to interpose an upper opening. The three recessed portions 15A to 15C are designed to have the same depth.

Figure 7:
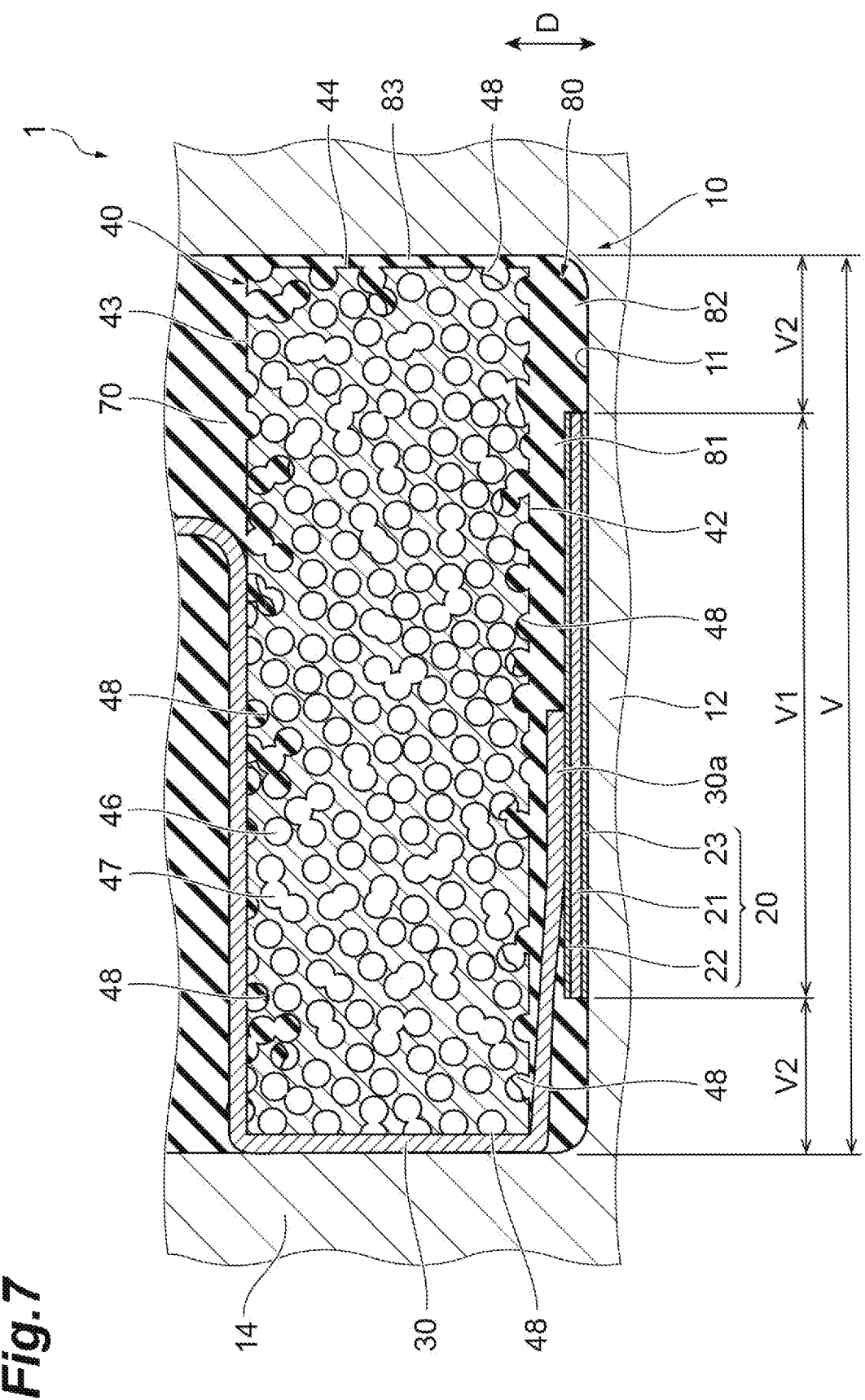
FIG. 7 is a partially enlarged view of FIG. 6.

The bottom wall portion 12 has a substantially disc shape. The bottom wall portion 12 includes a vibration region V. The vibration region V is a substantially elliptical plate-shaped region that closes a lower side opening of the tubular portion 14. A thickness of the vibration region V is uniform. As illustrated in FIG. 7, the vibration region V has an arrangement region V1 in which the piezoelectric element 20 is arranged and a peripheral region V2 of the arrangement region V1. The arrangement region V1 is a region that overlaps with the entire piezoelectric element 20 when viewed from a thickness direction D of the piezoelectric element 20. When viewed in the thickness direction D, an outer edge of the arrangement region V1 coincides with an outer edge of the piezoelectric element 20. When viewed in the thickness direction D, the peripheral region V2 is an annular region surrounding the piezoelectric element 20 and the arrangement region V1.

The piezoelectric element 20 is accommodated in the case 10. The piezoelectric element 20 is disposed on a bottom surface 11 of the bottom wall portion 12 inside the case 10. The piezoelectric element 20 is disposed in the arrangement region V1. As illustrated in FIG. 2, the piezoelectric element 20 has a rectangular plate-shaped outer shape. A thickness of the piezoelectric element 20 is, for example, 0.1 mm or more and 0.5 mm or less.

Figure 5:
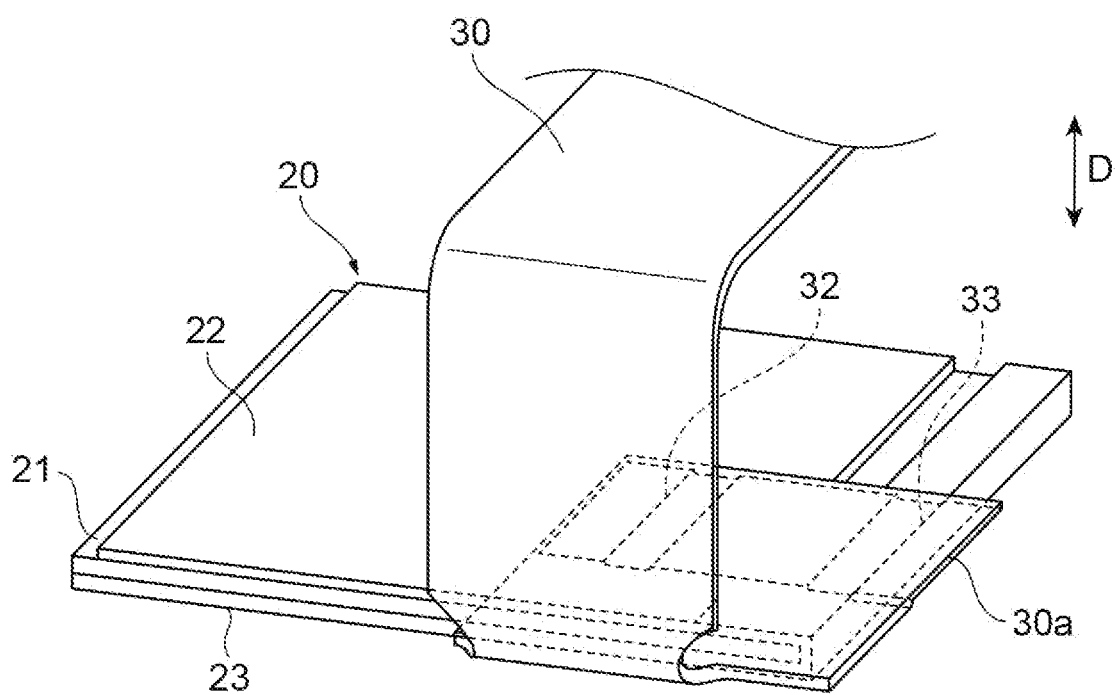
FIG. 5 is a schematic perspective view illustrating the piezoelectric element to which the wiring member is attached.

As illustrated in FIG. 5, the piezoelectric element 20 includes a piezoelectric layer 21 and a pair of external electrodes 22 and 23. The external electrode 22 covers an entire region of an upper surface of the piezoelectric layer 21 other than both end portions in a major axis direction of the vibration region V. The external electrode 23 includes a lower surface portion that covers an entire region of a lower surface of the piezoelectric layer 21, an upper surface portion that covers one end portion of the upper surface of the piezoelectric layer 21 away from the external electrode 22, and a side surface portion that covers one side surface of the piezoelectric layer 21 to connect the lower surface portion and the upper surface portion. The external electrode 22 and the upper surface portion of the external electrode 23 are separated from each other in the major axis direction of the vibration region V on the upper surface of the piezoelectric layer 21.

The piezoelectric layer 21 may have a single-layer structure including one piezoelectric material layer, or may have a multi-layer structure in which a plurality of piezoelectric material layers and internal electrode layers are alternately stacked. The piezoelectric material layer can be made of a piezoelectric ceramic material such as PZT. The piezoelectric element 20 is attached to the bottom wall portion 12 of the case 10 via, for example, an adhesive material such as an epoxy resin. The piezoelectric element 20 may be directly bonded to the bottom wall portion 12 of the case 10.

The wiring member 30 is electrically connected to the piezoelectric element 20. The wiring member 30 is accommodated in the case 10 together with the piezoelectric element 20. As illustrated in FIG. 5, the wiring member 30 has a sheet shape or a band shape, and one end portion 30a is disposed to be overlapped on the piezoelectric element 20. The wiring member 30 is, for example, a flexible substrate such as a flexible printed substrate (FPC) or a flexible flat cable (FFC). That is, the wiring member 30 is configured to include, for example, a resin sheet made of a resin such as a polyimide resin, and a plurality of wirings provided on the resin sheet.

A thickness of the wiring member 30 is, for example, 0.05 mm or more and 0.2 mm or less. The wiring member 30 electrically connects each of the external electrodes 22 and 23 of the piezoelectric element 20 with the pin terminals 60A and 60B to be described later by a plurality of wirings. Of the plurality of wirings of the wiring member 30, a wiring 32 is connected to the external electrode 22 and the pin terminal 60A, and a wiring 33 is connected to the external electrode 23 and the pin terminal 60B.

The foaming member 40 is disposed on the piezoelectric element 20. The foaming member 40 is accommodated in the case 10. The foaming member 40 is provided to overlap the entire piezoelectric element 20 when viewed in the thickness direction D. The foaming member 40 has a bottom surface 42, an upper surface 43, and a side surface 44 as surfaces thereof. The bottom surface 42 and the upper surface 43 oppose each other in the thickness direction D. The bottom surface 42 and the upper surface 43 have, for example, a substantially elliptical shape. The bottom surface 42 opposes the bottom wall portion 12 and the piezoelectric element 20 in the thickness direction D. The side surface 44 opposes the tubular portion 14 in a direction intersecting the thickness direction D. The end portion 30a of the wiring member 30 and the vibration damping material 80 are interposed between the foaming member 40 and the piezoelectric element 20.

Figure 8:
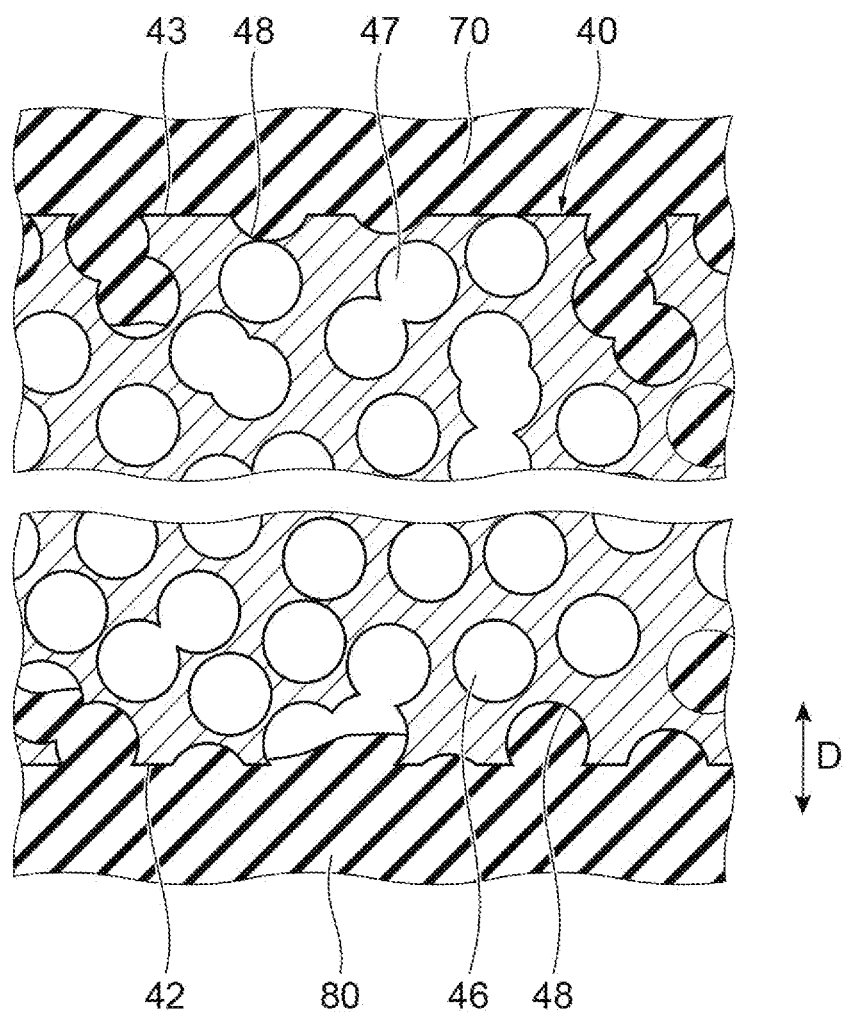
FIG. 8 is a partially enlarged view of FIG. 7.

For example, as illustrated in FIGS. 7 and 8, the foaming member 40 has a cell structure. The foaming member 40 is a sound absorbing body that absorbs vibration by cells. In the present embodiment, the foaming member 40 has a semi-closed and semi-open cell structure including closed cells 46 and open cells 47. In the open cells 47, cells are continuous. In the open cells 47, cells are connected to each other and three-dimensionally continuous. The open cells 47 are not only continuous in cross sections illustrated in FIGS. 7 and 8, but also continuous in a direction intersecting the cross sections. The foaming member 40 is, for example, a silicon sponge. The foaming member 40 may be a foaming body mainly including a thermoplastic resin. Thermoplastic resin includes, for example, ethylene propylene diene rubber (EPDM).

A plurality of depressions 48 due to cells is formed on the surfaces (bottom surface 42, upper surface 43 and side surface 44) of the foaming member 40. The depressions 48 are formed by cells exposed on the surface of the foaming member 40. The surface of the foaming member 40 has an uneven shape in which depression portions having the depressions 48 and projection portions having portions not provided with the depressions 48 are alternately continuous.

The cells of the foaming member 40 may have a shape that is flat with respect to a compression direction due to compression of the foaming member 40. In this case, an average aspect ratio of the cells may be, for example, 1.2 or more and 2.5 or less. The average aspect ratio is, for example, an average value of a ratio (Lb/La) of a maximum length Lb of the closed cells 46 in a direction orthogonal to the compression direction to a maximum length La of the closed cells 46 in the compression direction. The compression direction may be the thickness direction D or a direction orthogonal to the thickness direction D.

The average aspect ratio is obtained, for example, as follows. First, a cross-sectional photograph of the compressed foaming member 40 is acquired. The cross-sectional photograph is a photograph obtained by photographing a cross section when the foaming member 40 is cut by a plane along the compression direction. The acquired cross-sectional photograph is image-processed by software. By this image processing, a boundary of the cells is determined. The maximum length La and the maximum length Lb are obtained for all the closed cells 46 included in the cross-sectional photograph (cells appearing to be the closed cells 46 in the cross-sectional photograph), and the average value of the ratio (Lb/La) is calculated as the average aspect ratio.

Figure 6:
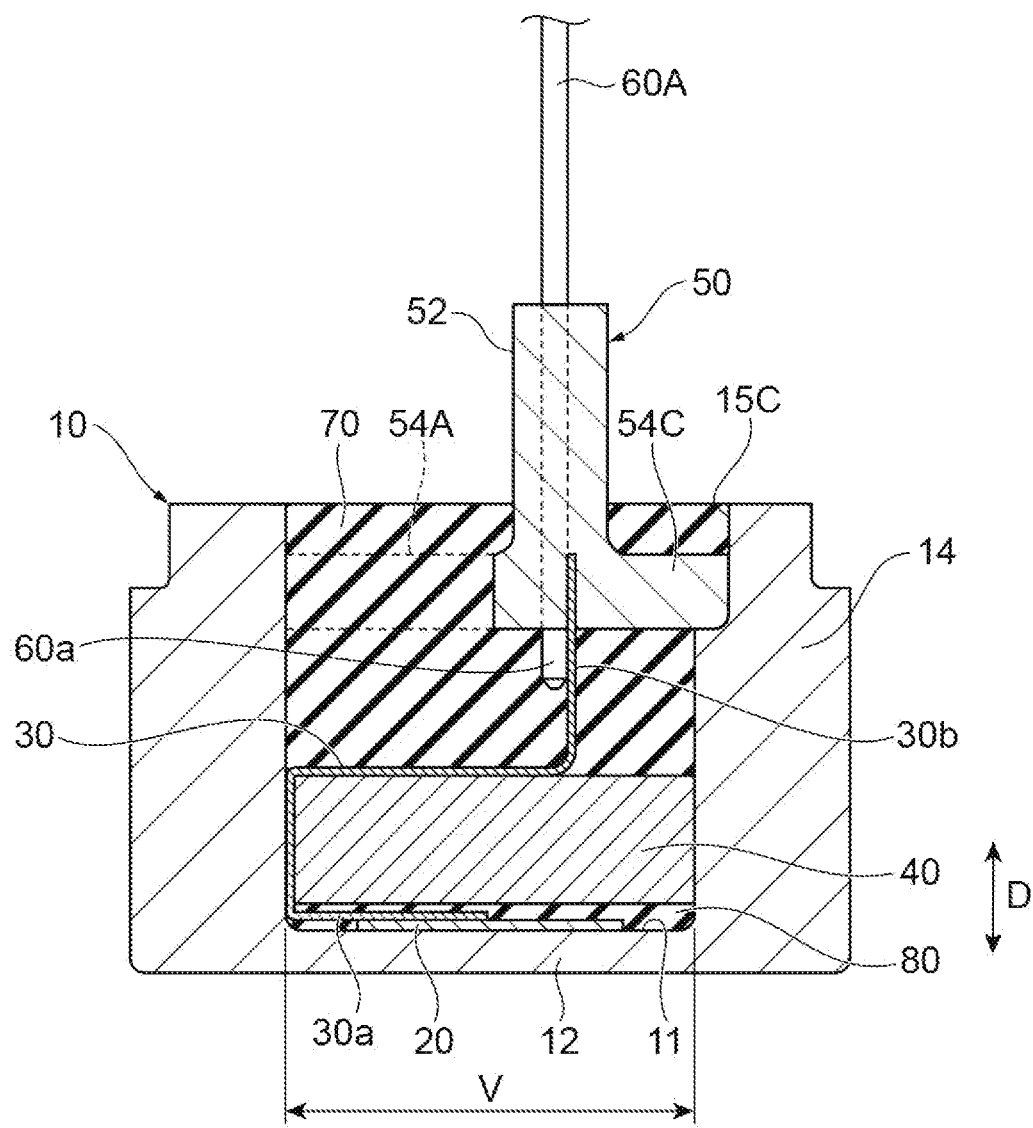
FIG. 6 is a VI-VI line sectional view of the ultrasonic transducer illustrated in FIG. 1.

As illustrated in FIGS. 6 and 7, the wiring member 30 creeps along the surface of the foaming member 40. Specifically, the wiring member 30 is drawn out from the bottom surface 42 side of the foaming member 40 to the upper surface 43 side through the side surface 44 side. Therefore, the one end portion 30a of the wiring member 30 is located on the bottom surface 42 side of the foaming member 40, and the other end portion 30b is located on the upper surface 43 side of the foaming member 40.

The pair of pin terminals (conductive terminals) 60A and 60B is connected to the end portion 30b of the wiring member 30. The pair of pin terminals 60A and 60B is electrically connected to an external board (not illustrated), and signals are transmitted and received between the external board and the ultrasonic transducer 1 via the pair of pin terminals 60A and 60B. Each of the pair of pin terminals 60A and 60B extends along the thickness direction D. Lower end portions 60a of the pin terminals 60A and 60B are electrically connected to the end portion 30b of the wiring member 30 erected on the upper side of the foaming member 40. More specifically, a lower end portion 60a of one pin terminal 60A is connected to the wiring 32 provided in the wiring member 30, and a lower end portion 60a of the other pin terminal 60B is connected to the wiring 33. The lower end portions 60a of the pin terminals 60A and 60B and the wirings 32 and 33 of the wiring member 30 are, for example, solder-bonded.

The holding member 50 holds the pair of pin terminals 60A and 60B with respect to the case 10. The holding member 50 is located on the upper side of the foaming member 40 and is separated from the bottom wall portion 12 of the case 10. The holding member 50 includes a main body 52 and three leg portions 54A, 54B, and 54C. The holding member 50 is made of, for example, a resin (for example, PBT resin). The holding member 50 is not limited to the PBT resin, and may be a PPS resin, an ABS resin, etc., or may contain glass fibers.

The main body 52 is a portion extending along the thickness direction D, and has a rectangular parallelepiped outer shape. The main body 52 is located near an upper opening of the case 10. The pair of pin terminals 60A and 60B is attached to the main body 52. Specifically, the pair of pin terminals 60A and 60B penetrates the main body 52, and the lower end portion 60a is exposed from the main body 52. The pair of pin terminals 60A and 60B is arranged in the major axis direction of the vibration region V in a posture parallel to each other, and attached to the main body 52 in a state of being separated by a predetermined distance.

All the three leg portions 54A, 54B, and 54C are provided integrally with the main body 52, and extend from the main body 52 in the direction orthogonal to the thickness direction D of the piezoelectric element 20. Of the three leg portions 54A, 54B, and 54C, two leg portions 54A and 54B have a long shape extending along a minor axis direction of the vibration region V and are parallel to each other. An end portion 54a of each of the leg portions 54A and 54B is inserted to each of the recessed portions 15A and 15B of the case 10 and is supported from below by the tubular portion 14 of the case 10. The leg portion 54C extends along the minor axis direction of the vibration region V similarly to the leg portions 54A and 54B. However, the leg portion 54C extends to the opposite side from the leg portions 54A and 54B with respect to the main body 52. The leg portion 54C is designed to be shorter than the leg portions 54A and 54B, and is entirely inserted into the recessed portion 15C of the case 10 and supported from below by the tubular portion 14 of the case 10.

As illustrated in FIG. 3, the recessed portion 15C of the case 10 and the leg portion 54C of the holding member 50 are located substantially in the middle of the vibration region V in the major axis direction, and disposed to be shifted from the leg portions 54A, 54B by approximately equal distances with respect to the major axis direction of the vibration region V. Therefore, a positional relationship among three points where the leg portions 54A to 54C are supported by the case 10 (that is, three positions where the recessed portions 15A to 15C are provided) is a positional relationship of an isosceles triangle whose apex is a point at which the leg portion 54C is supported.

The holding member 50 is attached to the case 10 by press-fitting the respective leg portions 54A to 54C of the holding member 50 into the recessed portions 15A to 15C. By designing the recessed portions 15A to 15C to have the same depth, height positions of the leg portions 54A to 54C (for example, height positions with respect to the bottom surface 11) mutually become the same, and a posture of the holding member 50 is stable. In a state where the holding member 50 is attached to the case 10, the pin terminals 60A and 60B extend in the thickness direction D.

Before attaching the holding member 50 to the case 10, the pin terminals 60A and 60B can be attached to the holding member 50. The pin terminals 60A and 60B are attached to the holding member 50 by, for example, insert molding.

Figure 1:
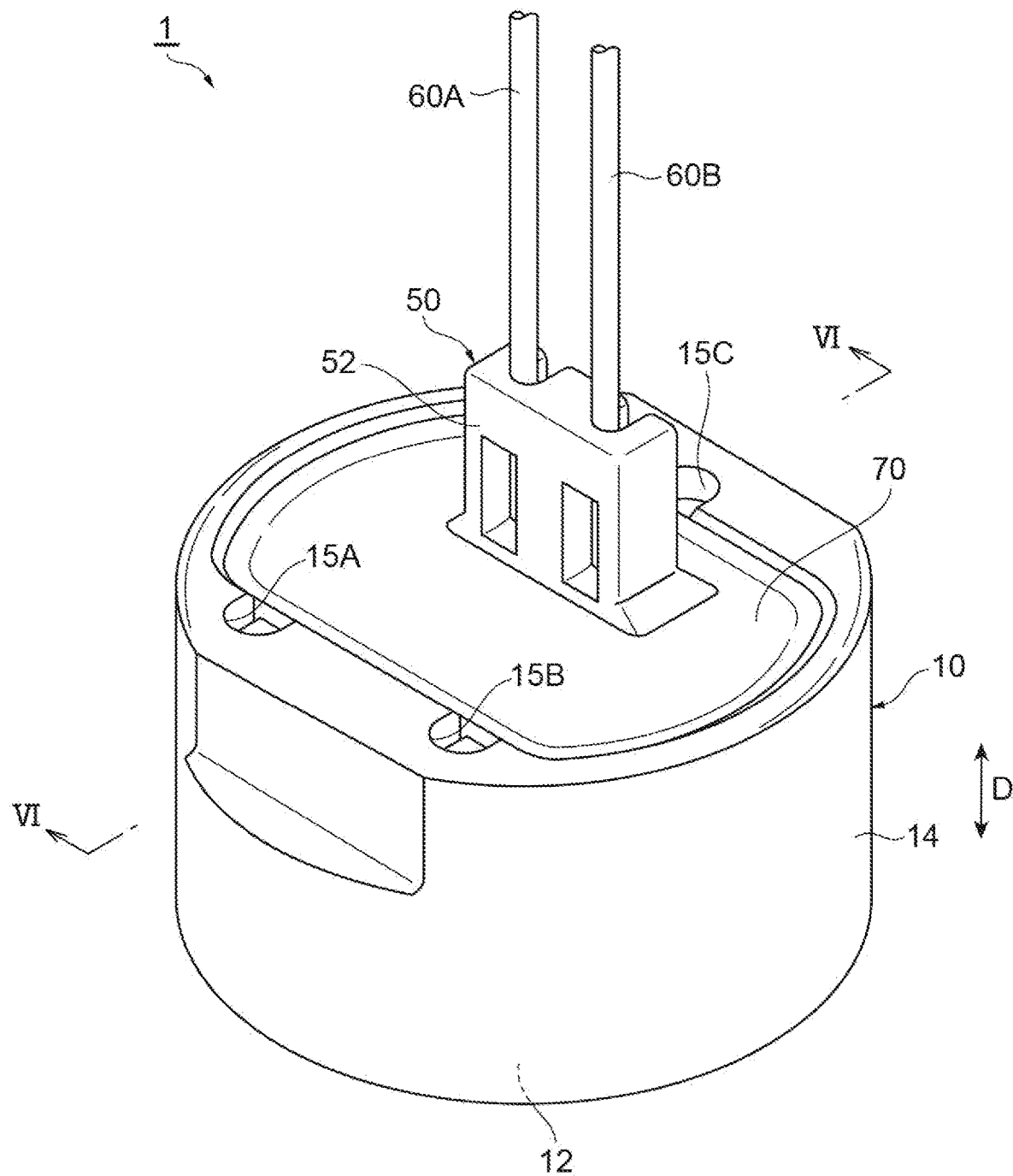
FIG. 1 is a schematic perspective view illustrating an ultrasonic transducer according to an embodiment.

The filler 70 fills the accommodation space of the case 10 after the holding member 50 is attached to the case 10. A gap in the accommodation space is filled with the filler 70. As illustrated in FIG. 1, a part of the main body 52 of the holding member 50 is located on the upper side of the upper opening of the case 10 and is exposed from the filler 70. The filler 70 is made of, for example, a resin. The filler 70 is made of, for example, RTV (Room Temperature Vulcanizing) silicone rubber, urethane foam, or epoxy resin.

The vibration damping material 80 is disposed between the piezoelectric element 20 and the foaming member 40. The vibration damping material 80 bonds the piezoelectric element 20 and the bottom surface 42 of the foaming member 40. The vibration damping material 80 is made of, for example, a resin. The vibration damping material 80 is made of, for example, RTV silicone rubber, urethane foam, or rubber (NBR, etc.). The vibration damping material 80 is made of, for example, the same material as that of the filler 70. As illustrated in FIG. 7, the vibration damping material 80 includes a portion 81 filling a space between the piezoelectric element 20 and the bottom surface 42, a portion 82 (first portion) filling a space between the peripheral region V2 and the bottom surface 42, and a portion 83 (second portion) disposed between the tubular portion 14 and the side surface 44.

The portion 81 is disposed between the end portion 30a of the wiring member 30 and the piezoelectric element 20. In the wiring member 30, the wirings 32 and 33 form a joint with the piezoelectric element 20. The portion 81 wraps around between a portion other than the joint at the end portion 30a of the wiring member 30 and the piezoelectric element 20. In this way, at the end portion 30a of the wiring member 30, the portion other than the joint is covered with the vibration damping material 80 on both sides in the thickness direction D.

The portions 81 to 83 are mutually integrally formed. Specifically, the portion 81 and the portion 82 are directly connected to each other. The portion 82 and the portion 83 are directly connected to each other. A thickness (average thickness) of the portion 81 is, for example, equivalent to the thickness (average thickness) of the piezoelectric element 20. The thickness of the portion 81 is a length in the thickness direction D between the upper surface of the piezoelectric element 20 and a virtual surface including the bottom surface 42 of the foaming member 40. The bottom surface 42 is a portion where the depression 48 is not provided, that is, a portion corresponding to the projection portion of the uneven shape. The thickness of the portion 81 is, for example, 0.5 times or more and 1.5 times or less the thickness of the piezoelectric element 20. The thickness of the portion 81 can be obtained from, for example, a cross-sectional photograph.

The vibration damping material 80 is applied on the piezoelectric element 20 after the piezoelectric element 20 is disposed in the arrangement region V1. The vibration damping material 80 is pressed by the bottom surface 42 of the foaming member 40 and expanded to integrally form the portions 81 to 83. The application amount of resin and the pressing force are appropriately set according to a desired thickness and shape of the vibration damping material 80. In the present embodiment, the vibration damping material 80 (portion 83) is inserted from the bottom surface 42 side and the filler 70 is inserted from the upper surface 43 side between the tubular portion 14 and the side surface 44. In the present embodiment, the vibration damping material 80 (portion 83) and the filler 70 are connected to each other. However, the vibration damping material 80 (portion 83) and the filler 70 may be separated from each other.

As illustrated in FIGS. 7 and 8, the filler 70 and the vibration damping material 80 seeps into the foaming member 40. The filler 70 and the vibration damping material 80 have a shape that follows the uneven shape of the surface of the foaming member 40. The filler 70 seeps into the foaming member 40 from the upper surface 43. The filler 70 is inserted into the depression 48 of the upper surface 43. The filler 70 may fill the entire depression 48 without any gaps, or may partially fill the depression 48. The vibration damping material 80 seeps into the foaming member 40 from the bottom surface 42. The vibration damping material 80 is inserted into the depression 48 of the bottom surface 42. The vibration damping material 80 may fill the entire depression 48 without any gaps, or may partially fill the depression 48.

The piezoelectric element 20 vibrates in response to a signal input from the pin terminals 60A and 60B. When the piezoelectric element 20 vibrates, mechanical vibration of an ultrasonic cycle occurs in a plate thickness direction, and ultrasonic vibration occurs in the plate thickness direction and a direction orthogonal to the plate thickness direction. Along with the ultrasonic vibration of the piezoelectric element 20, the vibration region V of the bottom wall portion 12 of the case 10 ultrasonically vibrates, and ultrasonic waves are output from the bottom wall portion 12 side to the outside of the case.

Hereinafter, an example of a method of manufacturing the ultrasonic transducer 1 will be described.

The wiring member 30 is attached to the piezoelectric element 20. The wiring member 30 is attached to the piezoelectric element 20 by, for example, solder-bonding. Subsequently, the wiring member 30 is bent according to the shape of the case 10. Subsequently, an adhesive is applied to the arrangement region V1 of the bottom surface 11 of the case 10. The adhesive is, for example, a thermosetting resin. Subsequently, the piezoelectric element 20 having the wiring member 30 is disposed in the arrangement region V1 and an adhesive is applied. Subsequently, the adhesive is cured by heating, and the piezoelectric element 20 is fixed to the arrangement region V1.

Subsequently, a resin serving as the vibration damping material 80 is applied onto the piezoelectric element 20. Subsequently, the foaming member 40 is disposed on the piezoelectric element 20, and the foaming member 40 is pressurized toward the piezoelectric element 20. The resin serving as the vibration damping material 80 is inserted into the depression 48 of the bottom surface 42 to follow the uneven shape of the bottom surface 42 while being expanded by the bottom surface 42 of the foaming member 40. At this time, a portion other than the end portion 30a of the wiring member 30 is kept along an inner surface of the tubular portion 14 of the case 10. Subsequently, for example, the pair of pin terminals 60A and 60B is attached to the holding member 50 by insert molding. Subsequently, on the upper surface 43 of the foaming member 40, the lower end portions 60a of the pair of pin terminals 60A and 60B are connected to the wirings 32 and 33 of the wiring member 30 by, for example, solder-bonding.

Subsequently, the holding member 50 is attached to the case 10. Specifically, the leg portions 54A, 54B, and 54C of the holding member 50 are press-fit into the recessed portions 15A, 15B, and 15C of the case 10. In this way, the pair of pin terminals 60A and 60B is attached to the case 10 together with the holding member 50. Subsequently, after filling the case 10 with the resin serving as the filler 70, the case 10 is left at room temperature for a predetermined time or longer. In this way, the resin is cured to become the filler 70 and the vibration damping material 80. As a result, the ultrasonic transducer 1 is obtained.

Hereinafter, effects of the ultrasonic transducer 1 according to the embodiment will be described.

In the ultrasonic transducer 1, since the vibration damping material 80 bonds the bottom surface 42 of the foaming member 40 and the piezoelectric element 20, vibration of the piezoelectric element 20 can be suppressed by the vibration damping material 80. The vibration of the piezoelectric element 20 is further suppressed by being absorbed by the foaming member 40. Since the plurality of depressions 48 is formed on the bottom surface 42, the vibration damping material 80 can be inserted into the plurality of depressions 48. In this way, the vibration damping material 80 can be allowed to follow the shape of the bottom surface 42, and the foaming member 40 and the piezoelectric element 20 can be strongly bonded. As a result, the reverberation of the ultrasonic component can be further reduced. Note that it was confirmed by experiments of the present inventors that the reverberation of the ultrasonic component was not reduced when the vibration damping material 80 was not bonded to the foaming member 40.

Figure 9:
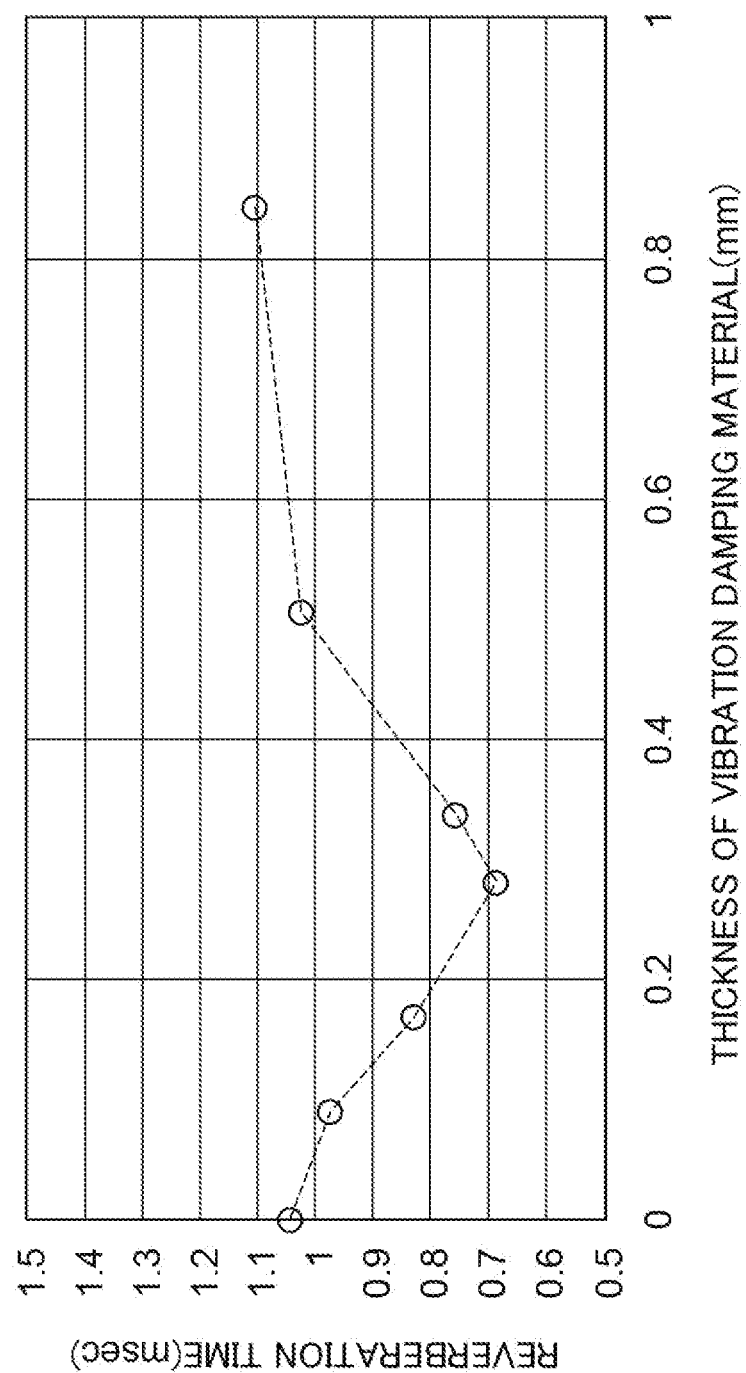
FIG. 9 is a graph illustrating a relationship between a thickness of a vibration damping material and a reverberation time.

The thickness of the portion 81 of the vibration damping material 80 is 0.5 times or more and 1.5 times or less the thickness of the piezoelectric element 20. In this way, the reverberation of the ultrasonic component is further reduced. As illustrated in FIG. 9, it was confirmed by experiments of the present inventors that the reverberation time was the shortest when the thickness of the portion 81 of the vibration damping material 80 was around 0.3 mm. The thickness of the piezoelectric element 20 used in this experiment is 0.2 mm.

The vibration damping material 80 seeps into the foaming member 40 from the bottom surface 42. That is, the vibration damping material 80 is inserted into the plurality of depressions 48 on the bottom surface 42. In this way, the reverberation of the ultrasonic component is reliably reduced.

The bottom wall portion 12 has the arrangement region V1 in which the piezoelectric element 20 is disposed, and the peripheral region V2 surrounding the arrangement region V1. The vibration damping material 80 includes the portion 82 filling the space between the peripheral region V2 and the bottom surface 42. According to the portion 82, the reverberation of the ultrasonic component is further reduced.

The vibration damping material 80 includes the portion 83 connected to the portion 82 and disposed between the tubular portion 14 of the case 10 and the side surface 44 of the foaming member 40. According to the portion 83, the vibration of the piezoelectric element 20 transmitted through the tubular portion 14 is suppressed, and thus the reverberation of the ultrasonic component is further reduced.

The wiring member 30 is a flexible substrate. The end portion 30a of the wiring member 30 is interposed between the piezoelectric element 20 and the foaming member 40. When the wiring member 30 is thick, a distance between the piezoelectric element 20 and the foaming member 40 becomes large, and it is necessary to increase the thickness of the vibration damping material 80 in accordance with this distance. Therefore, it is difficult to set the thickness of the vibration damping material 80 in an appropriate range for suppressing the reverberation of the ultrasonic component. In the present embodiment, since the wiring member 30 is thin, it is easy to set the thickness of the vibration damping material 80 in an appropriate range.

The vibration damping material 80 is made of resin. Therefore, the reverberation of the ultrasonic component is reliably reduced.

The foaming member 40 contains open cells. Therefore, the vibration damping material 80 easily seeps further into the foaming member 40.

The wiring member 30 is covered with the vibration damping material 80 on both sides in the thickness direction D of the piezoelectric element 20. In this way, the reverberation of the ultrasonic component is further reduced.

In the ultrasonic transducer 1, the holding member 50 holding the pin terminals 60A and 60B is directly held by the case 10. According to the holding member 50, it is possible to suppress a relative position shift of the pin terminals 60A and 60B with respect to the case 10. In particular, since the holding member 50 is press-fit into the recessed portions 15A to 15C of the case 10, the holding member 50 is firmly fixed to the case 10. Therefore, a relative position shift of the holding member 50 with respect to the case 10 is difficult. As a result, the relative position shift of the pin terminals 60A and 60B with respect to the case 10 is more effectively suppressed. Note that the holding member 50 may be held in the case 10 by adhesion in addition to press-fitting.

As described above, the invention is not necessarily limited to the above-described embodiment, and various modifications can be made without departing from a gist thereof. For example, the wiring member 30 is not limited to the flexible substrate, and may be a lead frame or a lead wire. Further, the piezoelectric element 20 is not limited to the rectangular plate shape, and may have, for example, a circular plate shape or an elliptical plate shape.

In the embodiment, the holding member 50 is supported by the case 10 at three points, and the three-point support effectively suppresses the relative position shift of the pin terminals 60A and 60B with respect to the case 10. However, the holding member 50 may be supported by the case 10 at one point, two points, or four or more points. Further, the ultrasonic transducer 1 may not include the holding member 50.

Figure 10:
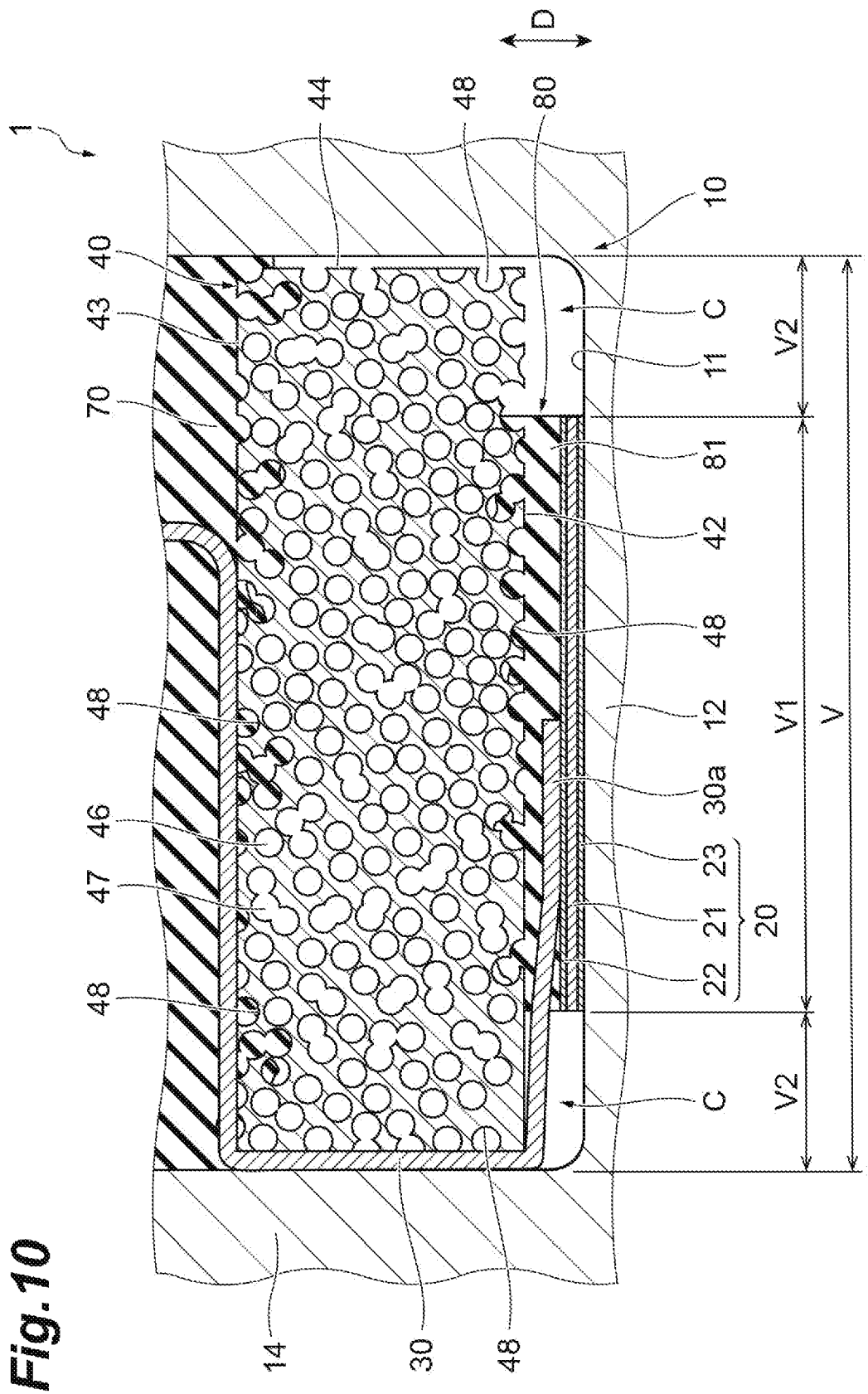
FIG. 10 is a cross-sectional view of an ultrasonic transducer according to a modification.

As illustrated in FIG. 10, in an ultrasonic transducer 1A according to a modification, a cavity C is formed between the peripheral region V2 and the bottom surface 42. Further, the vibration damping material 80 includes the portion 81 and does not include the portions 82 and 83. Such a shape of the vibration damping material 80 is realized by appropriately setting the application amount of the resin serving as the vibration damping material 80 and the pressing force. In the ultrasonic transducer 1A, since the bottom surface 42 of the foaming member 40 and the piezoelectric element 20 are bonded by the vibration damping material 80, the reverberation of the ultrasonic component can be further reduced. In the ultrasonic transducer 1A, since the cavity C is formed around the piezoelectric element 20, the vibration of the piezoelectric element 20 is not easily restrained by the vibration damping material 80. In this way, transmission and reception sensitivity increases.

What is claimed is:

1. An ultrasonic transducer comprising:
   a case including a bottom wall;
   a piezoelectric element disposed on the bottom wall inside the case;
   a wiring member electrically connected to the piezoelectric element;
   a foaming member disposed on the piezoelectric element; and
   a vibration damping material disposed between the piezoelectric element and the foaming member,
   wherein:
     the foaming member has a bottom surface opposing the piezoelectric element in a thickness direction of the piezoelectric element, a plurality of depressions being formed on the bottom surface,
     the vibration damping material bonds the piezoelectric element and the bottom surface and seeps into the foaming member from the bottom surface.

2. The ultrasonic transducer according to claim 1, wherein a thickness of the vibration damping material is 0.5 times or more and 1.5 times or less a thickness of the piezoelectric element.

3. The ultrasonic transducer according to claim 1,
wherein the bottom wall includes an arrangement region and a peripheral region surrounding the arrangement region, the piezoelectric element being disposed in the arrangement region, and
a cavity is formed between the peripheral region and the bottom surface.

4. The ultrasonic transducer according to claim 1,
wherein the bottom wall includes an arrangement region and a peripheral region surrounding the arrangement region, the piezoelectric element being disposed in the arrangement region, and
the vibration damping material includes a first portion filling a space between the peripheral region and the bottom surface.

5. The ultrasonic transducer according to claim 4,
wherein the case includes a side wall,
the foaming member has a side surface opposing the side wall, and
the vibration damping material includes a second portion connected to the first portion and disposed between the side wall and the side surface.

6. The ultrasonic transducer according to claim 1, wherein the wiring member is a flexible substrate.

7. The ultrasonic transducer according to claim 1, wherein the vibration damping material is made of resin.

8. The ultrasonic transducer according to claim 1, wherein the foaming member contains an open cell.

9. The ultrasonic transducer according to claim 1, wherein the wiring member is covered with the vibration damping material on both sides in a thickness direction of the piezoelectric element.

10. The ultrasonic transducer according to claim 1, wherein:
the case includes a side wall which has tubular shape, and
the bottom wall closes a lower end opening of the side wall.

11. The ultrasonic transducer according to claim 1, wherein the foaming member has a semi-closed and semi-open cell structure including closed cell and open cell.

12. The ultrasonic transducer according to claim 1, wherein the piezoelectric element is bonded to the bottom wall.

13. The ultrasonic transducer according to claim 1, wherein a thickness of the piezoelectric element is 0.1 mm or more and 0.5 mm or less.

14. The ultrasonic transducer according to claim 1, wherein a thickness of the wiring member is 0.05 mm or more and 0.2 mm or less.

15. The ultrasonic transducer according to claim 1, wherein the foaming member is a silicone sponge.

16. An ultrasonic transducer comprising:
a case including a bottom wall;
a piezoelectric element disposed on the bottom wall inside the case;
a wiring member electrically connected to the piezoelectric element;
a foaming member disposed on the piezoelectric element;
a vibration damping material disposed between the piezoelectric element and the foaming member; and
a filler filled in the case and opposing the vibration damping material via the foaming member, wherein:
the foaming member has a bottom surface opposing the piezoelectric element in a thickness direction of the piezoelectric element, a plurality of depressions being formed on the bottom surface, and
the vibration damping material bonds the piezoelectric element and the bottom surface.

17. The ultrasonic transducer according to claim 16, wherein the vibration damping material is made of the same material as that of the filler.

18. The ultrasonic transducer according to claim 16, wherein the foaming member has an upper surface opposing the bottom surface, a plurality of depressions being formed on the upper surface, and
the filler seeps into the foaming member from the upper surface.

19. An ultrasonic transducer comprising:
a case including a bottom wall;
a piezoelectric element disposed on the bottom wall inside the case;
a wiring member electrically connected to the piezoelectric element;
a foaming member disposed on the piezoelectric element; and
a vibration damping material disposed between the piezoelectric element and the foaming member, wherein:
the foaming member has a bottom surface opposing the piezoelectric element in a thickness direction of the piezoelectric element, a plurality of depressions being formed on the bottom surface,
the vibration damping material bonds the piezoelectric element and the bottom surface, and
an average aspect ratio of cells of the foaming member is 1.2 or more and 2.5 or less.

* * * * *